(12) United States Patent  
Garcia-Martin et al.

(10) Patent No.: US 8,693,391 B2
(45) Date of Patent: Apr. 8, 2014

(54) PEER TO PEER SERVICES IN A WIRELESS COMMUNICATION NETWORK

(75) Inventors: Miguel A. Garcia-Martin, Helsinki (FI); Marcin Wieslaw Matuszewski, Espoo (FI)

(73) Assignee: Nokia Corporation, Espoo (FI)

( * ) Notice: Subject to any disclaimer, the term of this patent is extended or adjusted under 35 U.S.C. 154(b) by 678 days.

(21) Appl. No.: 11/486,490

(22) Filed: Jul. 14, 2006

(65) Prior Publication Data

US 2007/0237139 A1 Oct. 11, 2007

(30) Foreign Application Priority Data

Apr. 11, 2006 (GB) .................................. 0607294.6

(51) Int. Cl.
*H04W 4/00* (2009.01)
*H04L 12/28* (2006.01)
*G06F 15/16* (2006.01)

(52) U.S. Cl.
USPC ........ 370/328; 370/389; 370/395.2; 709/227; 709/228; 709/229

(58) Field of Classification Search
USPC .................... 370/395.2, 389; 709/227–229
See application file for complete search history.

(56) References Cited

U.S. PATENT DOCUMENTS

| | | | |
|---|---|---|---|
| 4,926,326 A | 5/1990 | McKinley | |
| 5,542,115 A | 7/1996 | Wong et al. | |
| 5,631,847 A | 5/1997 | Kikinis | |
| 5,740,549 A | 4/1998 | Reilly et al. | |
| 5,832,474 A | 11/1998 | Lopresti et al. | |
| 5,852,436 A | 12/1998 | Franklin et al. | |
| 5,862,325 A | 1/1999 | Reed et al. | |
| 5,933,478 A | 8/1999 | Ozaki et al. | |
| 6,061,796 A | 5/2000 | Chen et al. | |
| 6,065,044 A | 5/2000 | Ogasawara | |
| 6,067,561 A | 5/2000 | Dillon | |
| 6,094,676 A | 7/2000 | Gray et al. | |

(Continued)

FOREIGN PATENT DOCUMENTS

EP 1427170 A2 6/2004
EP 1429513 A 6/2004

(Continued)

OTHER PUBLICATIONS

Singh et al. "Peer-to-Peer Internet Technology using SIP", Columbia University, Oct. 31, 2004. Retrieved from the interent on Jul. 18, 2005 at<URL:http://www1.cs.columbia.edu/library/TR-repository/reports/reports-2004/cucs-044-04.pdf>.*

(Continued)

*Primary Examiner* — Faruk Hamza
*Assistant Examiner* — Thinh Tran
(74) *Attorney, Agent, or Firm* — Banner & Witcoff, Ltd.

(57) ABSTRACT

This invention relates to a node for providing peer-to-peer services in a communication network, the network comprising of at least one further node. The node comprises; an input arranged to receive at least one SIP peer-to-peer request; an output arranged to transmit the at least one SIP peer-to-peer request from the node to at least one of the at least one further nodes; and wherein the input is further arranged to receive at least one SIP peer-to-peer response from the at least one further node and the output is arranged to transmit the SIP peer-to-peer response.

35 Claims, 4 Drawing Sheets

(56) References Cited

U.S. PATENT DOCUMENTS

| | | | |
|---|---|---|---|
| 6,094,681 A | 7/2000 | Shaffer et al. | |
| 6,278,448 B1 | 8/2001 | Brown et al. | |
| 6,288,715 B1 | 9/2001 | Bain et al. | |
| 6,366,907 B1 | 4/2002 | Fanning et al. | |
| 6,396,513 B1 | 5/2002 | Helfman et al. | |
| 6,400,810 B1 | 6/2002 | Skladman et al. | |
| 6,438,632 B1 | 8/2002 | Kikugawa | |
| 6,507,866 B1 | 1/2003 | Barchi | |
| 6,549,916 B1 | 4/2003 | Sedlar | |
| 6,591,310 B1 | 7/2003 | Johnson | |
| 6,658,000 B1 | 12/2003 | Raciborski et al. | |
| 6,675,205 B2 | 1/2004 | Meadway et al. | |
| 6,757,684 B2 | 6/2004 | Svendsen et al. | |
| 6,779,039 B1 | 8/2004 | Bommareddy et al. | |
| 6,865,600 B1 | 3/2005 | Brydon et al. | |
| 7,030,837 B1 | 4/2006 | Vong et al. | |
| 7,068,309 B2 | 6/2006 | Toyama et al. | |
| 7,089,301 B1 | 8/2006 | Labio et al. | |
| 7,107,316 B2 | 9/2006 | Brown et al. | |
| 7,139,594 B2 | 11/2006 | Nagatomo | |
| 7,170,999 B1 | 1/2007 | Kessler et al. | |
| 7,305,082 B2 | 12/2007 | Elazar et al. | |
| 7,310,629 B1 | 12/2007 | Mendelson et al. | |
| 7,430,616 B2 | 9/2008 | Husain et al. | |
| 7,496,630 B2 | 2/2009 | Arellano et al. | |
| 7,509,377 B2 | 3/2009 | Harvey et al. | |
| 7,509,492 B2* | 3/2009 | Boyen et al. | 713/165 |
| 7,549,047 B2 | 6/2009 | Balfanz et al. | |
| 7,551,570 B2 | 6/2009 | Nurminen et al. | |
| 7,613,770 B2 | 11/2009 | Li | |
| 7,643,458 B1 | 1/2010 | Talwar | |
| 7,769,810 B1 | 8/2010 | Kaufman | |
| 2002/0007401 A1 | 1/2002 | Suzuki | |
| 2002/0049760 A1 | 4/2002 | Scott et al. | |
| 2002/0059384 A1 | 5/2002 | Kaars | |
| 2002/0095399 A1 | 7/2002 | Devine et al. | |
| 2002/0129086 A1 | 9/2002 | Garcia-Luna-Aceves et al. | |
| 2002/0143944 A1 | 10/2002 | Traversat et al. | |
| 2002/0147771 A1 | 10/2002 | Traversat et al. | |
| 2002/0156893 A1 | 10/2002 | Pouyoul et al. | |
| 2002/0165979 A1* | 11/2002 | Vincent | 709/239 |
| 2002/0184310 A1 | 12/2002 | Traversat et al. | |
| 2002/0184311 A1 | 12/2002 | Traversat et al. | |
| 2002/0184357 A1* | 12/2002 | Traversat et al. | 709/223 |
| 2002/0188657 A1 | 12/2002 | Traversat et al. | |
| 2002/0188735 A1 | 12/2002 | Needham et al. | |
| 2002/0194256 A1 | 12/2002 | Needham et al. | |
| 2003/0018708 A1 | 1/2003 | Hlasny | |
| 2003/0027595 A1* | 2/2003 | Ejzak | 455/560 |
| 2003/0041265 A1 | 2/2003 | Lagimonier et al. | |
| 2003/0050834 A1 | 3/2003 | Caplan | |
| 2003/0055818 A1 | 3/2003 | Faybishenko et al. | |
| 2003/0056093 A1 | 3/2003 | Huitema et al. | |
| 2003/0063770 A1 | 4/2003 | Svendsen et al. | |
| 2003/0070070 A1 | 4/2003 | Yeager et al. | |
| 2003/0074403 A1 | 4/2003 | Harrow et al. | |
| 2003/0088547 A1 | 5/2003 | Hammond | |
| 2003/0088571 A1* | 5/2003 | Ekkel | 707/100 |
| 2003/0110181 A1 | 6/2003 | Schuetze et al. | |
| 2003/0125063 A1 | 7/2003 | Svensson et al. | |
| 2003/0152034 A1* | 8/2003 | Zhang et al. | 370/252 |
| 2003/0177184 A1 | 9/2003 | Dickerman et al. | |
| 2003/0182428 A1 | 9/2003 | Li et al. | |
| 2003/0191816 A1 | 10/2003 | Landress et al. | |
| 2003/0225834 A1 | 12/2003 | Lee et al. | |
| 2003/0233455 A1 | 12/2003 | Leber et al. | |
| 2004/0003090 A1 | 1/2004 | Deeds | |
| 2004/0030743 A1 | 2/2004 | Hugly et al. | |
| 2004/0041836 A1 | 3/2004 | Zaner et al. | |
| 2004/0041849 A1 | 3/2004 | Mock et al. | |
| 2004/0064512 A1 | 4/2004 | Arora | |
| 2004/0068429 A1 | 4/2004 | MacDonald | |
| 2004/0088348 A1 | 5/2004 | Yeager et al. | |
| 2004/0103280 A1 | 5/2004 | Balfanz et al. | |
| 2004/0107242 A1 | 6/2004 | Vert et al. | |
| 2004/0114605 A1 | 6/2004 | Karaoguz et al. | |
| 2004/0133571 A1 | 7/2004 | Horne et al. | |
| 2004/0148434 A1* | 7/2004 | Matsubara et al. | 709/246 |
| 2004/0179689 A1* | 9/2004 | Maggenti et al. | 380/270 |
| 2004/0205219 A1* | 10/2004 | Li et al. | 709/231 |
| 2004/0243580 A1 | 12/2004 | Markki et al. | |
| 2004/0243665 A1 | 12/2004 | Markki et al. | |
| 2004/0243672 A1 | 12/2004 | Markki et al. | |
| 2004/0243682 A1 | 12/2004 | Markki et al. | |
| 2005/0021398 A1 | 1/2005 | McCleskey et al. | |
| 2005/0216300 A1 | 9/2005 | Appelman | |
| 2005/0243740 A1 | 11/2005 | Chen | |
| 2006/0004789 A1 | 1/2006 | Lunt | |
| 2006/0010204 A1 | 1/2006 | Jalava et al. | |
| 2006/0020662 A1 | 1/2006 | Robinson | |
| 2006/0039359 A1* | 2/2006 | Pang | 370/352 |
| 2006/0153247 A1* | 7/2006 | Stumer | 370/517 |
| 2006/0168006 A1 | 7/2006 | Shannon et al. | |
| 2006/0209727 A1 | 9/2006 | Jennings et al. | |
| 2006/0218225 A1 | 9/2006 | Hee Voon | |
| 2007/0064702 A1* | 3/2007 | Bates et al. | 370/392 |
| 2007/0104121 A1* | 5/2007 | Shaffer et al. | 370/276 |
| 2007/0230482 A1 | 10/2007 | Shim | |
| 2007/0237139 A1 | 10/2007 | Garcia-Martin et al. | |
| 2007/0239759 A1 | 10/2007 | Shen | |
| 2007/0250582 A1 | 10/2007 | Sidhu | |
| 2008/0177860 A1 | 7/2008 | Khedouri et al. | |
| 2008/0259942 A1* | 10/2008 | Skog et al. | 370/401 |
| 2009/0187982 A1 | 7/2009 | Balfanz et al. | |
| 2010/0095009 A1 | 4/2010 | Matuszewski et al. | |
| 2011/0041158 A1 | 2/2011 | Ranzini et al. | |

FOREIGN PATENT DOCUMENTS

| | | |
|---|---|---|
| EP | 1452978 A2 | 9/2004 |
| EP | 1526471 A1 | 4/2005 |
| WO | 03/085559 A1 | 10/2003 |
| WO | 2004/046969 A1 | 6/2004 |
| WO | WO 2004/084030 | 9/2004 |
| WO | 2004/107124 A2 | 12/2004 |
| WO | 2005/041534 A1 | 5/2005 |
| WO | WO 2005/125149 | 12/2005 |

OTHER PUBLICATIONS

Singh et al. "Peer-to-Peer Internet Technology using SIP", Columbia University, Oct. 31, 2004. Retrieved from the internet on Jul. 18, 2005 at<URL:http://www1.cs.columbia.edu/library/TR-repository/reports/reports-2004/cucs-044-04.pdf>.*

Singh et al. "Peer-to-Peer Internet Technology using SIP", Columbia Unibersity, Oct. 31, 2004. Retrieved from the internet on Jul. 18, 2005 at<URL:http://www1.cs.columbia.edu/library/TR-repository/reports/reports-2004/cucs-044-04.pdf>.*

Quittek et al. "Problem Statement for SIP-signalled Peer-to-Peer Communication across Middleboxes", Feb. 27, 2006, IETF.*

Singh et al. "Peer-to-Peer Internet Technology using SIP", Columbia University, Oct. 31, 2004. <Retrieved from the internet on Jul. 18, 2005 at<URL:http://www1.cs.columbia.edu/library/TR-repository/reports-2004/cucs-044-04.pdf>.*

Bryan et al. "A P2P Approach to SIP Registration and Resource Location draft-bryan-sipping-p2p-02", IETF, Mar. 5, 2006.*

Singh et al. "Peer-to-Peer Internet Technology using SIP", Columbia University, Oct. 31, 2004. Retrieved from the internet on Jul. 18, 2005 at <URL:http://www1.cs.columbia.edu/library/TR-repository/reports/reports-2004/cucs-044-04.pdf>.

Georgescu, Adrian. "Addressing Survivability and Scalability of SIP Networks by using Peer-to-Peer Protocols", Sep. 5, 2005. Received from the internet on Mar. 16, 2006 at <URL:http://www.sipcenter.com/sip.nsf/html/AG+P2P+SIP>.

International Search Report for PCT Application PCT/IB2007/000677.

"Problem Statement for SIP-signalled Peer-to-Peer Communication across Middleboxes" draft-quittek-p2p-sip-middlebox-00, J. Quittek et al., Feb. 27, 2006.

Matuszewski, M, Beijar, N., Lehtinen, J. and Hyyryläinen, T. 'Content Sharing in Mobile P2P Networks. Myth or reality?' International Journal of Mobile Network Design and Innovation, vol. 1, Issue 3/4 (Jan. 2006) pp. 197-207.

(56) References Cited

OTHER PUBLICATIONS

Chinese Office Action for Chinese Application No. 200780012983.9, dated Mar. 22, 2011.
English translation for Chinese Office Action for Chinese Application No. 200780012983.9, dated Mar. 22, 2011.
Office Action in U.S. Appl. No. 12/443,922, dated Nov. 9, 2011.
Office action for Japanese Patent Application No. 2009-504840, dated May 30, 2011.
English translation of Office action for Japanese Patent Application No. 2009-504840, dated May 30, 2011.
Non-Final Office action received for corresponding U.S. Appl. No. 10/886,002, dated Jun. 29, 2011, 17 pages.
Office action for European Patent Application No. 10166569.3, dated Jul. 4, 2011.
Non-Final Office action received for corresponding U.S. Appl. No. 10/607,618, dated Dec. 12, 2006, 22 pages.
Final Office action received for corresponding U.S. Appl. No. 10/607,618, dated Jun. 29, 2007, 23 pages.
Non-Final Office action received for corresponding U.S. Appl. No. 10/607,618, dated Dec. 19, 2007, 24 pages.
Final Office action received for corresponding U.S. Appl. No. 10/607,618, dated Jun. 27, 2008, 25 pages.
Non-Final Office action received for corresponding U.S. Appl. No. 10/607,618, dated Oct. 9, 2008, 15 pages.
Final Office action received for corresponding U.S. Appl. No. 10/607,618, dated Jul. 9, 2009, 17 pages.
Handley et al., "SIP: Session Initiation Protocol", Status of this Memo, Retrieved on Mar. 17, 2010, pp. 13-155, Webpage available at: http://www.ietf.org/rfc/rfc2543.txt.
"Mini Http Server. Net", Retrieved on Mar. 24, 2010, pp. 157-160. Webpage available at: http://minihttpserver.net/fbbs.
Office action received for corresponding Chinese Patent Application No. 200580022710.3, dated May 8, 2009, 7 pages of Office action and 11 pages of Office action translation.
Office action received for corresponding Chinese Patent Application No. 200580022710.3, dated Sep. 2, 2010, 7 pages of Office action and 11 pages of Office action translation.
Extended European Search Report received for corresponding European Patent Application No. 10166569.3, dated Sep. 17, 2010, 6 pages.
Office action received for corresponding Korean Patent Application No. 2007-7002771, dated Dec. 20, 2007, 2 pages of Office action translation.
Cohen, "Incentives Build Robustness in BitTorrent", May 22, 2003, pp. 1-5.
Non-Final Office action received for corresponding U.S. Appl. No. 10/886,002, dated Mar. 16, 2009, 25 pages.
Final Office action received for corresponding U.S. Appl. No. 10/886,002, dated Dec. 2, 2009, 23 pages.
Final Office action received for corresponding U.S. Appl. No. 10/886,002, dated Sep. 3, 2010, 16 pages.
Bryan et al., "SOSIMPLE: A Serverless, Standards-based, P2P SIP Communication System", Proceedings of the First International Workshop on Advanced Architectures and Algorithms for Internet Delivery and Applications, Jun. 15, 2005, pp. 1-8.
Mukherjee et al., "U-P2P: a peer-to-peer system for description and discovery of resource-sharing communities", Proceedings of the 22nd International Conference on Distributed Computing Systems Workshops, 2002, pp. 701-705.
Schollmeier et al., "Protocol for Peer-to-Peer Networking in Mobile Environments", Proceedings of the 12th International Conference on Computer Communications and Networks, 2003, Oct. 20-22, 2003, pp. 121-127.
International Preliminary Report on Patentability received for corresponding Patent Cooperation Treaty Application No. PCT/IB2005/001126, dated Jan. 18, 2007, 5 pages.
International Search Report and Written Opinion received for corresponding Patent Cooperation Treaty Application No. PCT/IB2005/001126, dated Oct. 27, 2005, 6 pages.
Matuszewski et al., "Mobile peer-to-peer content sharing application", 3rd IEEE Consumer Communications and Networking Conference, Jan. 8-10, 2006, pp. 1324-1325.
Matuszewski et al., "Mobile peer-to-peer content sharing services in IMS", Proceedings of the International Conference on Telecommunication Systems, Modeling and Analysis, 2005.
Office action received for corresponding European Patent Application No. 07705695.0, dated Sep. 28, 2009, 5 pages.
Office action received for corresponding European Patent Application No. 07705695.0, dated Dec. 30, 2009, 4 pages.
International Preliminary Report on Patentability received for corresponding Patent Cooperation Treaty Application No. PCT/IB2007/000677, dated Aug. 8, 2008, 5 pages.
"Chord/DHash Project—Overview", Retrieved on Mar. 11, 2011, Webpage available at: http://pdos.csail.mit.edu/chord/.
Garcia-Martin et al., "A Session Initiation Protocol (SIP) Event Package and Data Format for Describing Generic Resources", draft-garcia-sipping-resource-event-package-00.txt, Retrieved on Mar. 11, 2011, Webpage available at: http://www.mail-archive.com/i-d-announce@ietf.org/msg10628.html.
Garcia-Martin et al."A Framework for Sharing Resources with the Session Initiation Protocol (SIP)", Internet-Draft, draft-beijar-sipping-resource-sharing-00.txt, Jun. 2006.
International Search Report and Written Opinion received for corresponding Patent Cooperation treaty Application No. PCT/IB2007/053981, dated Apr. 3, 2008, 16 pages.
Kunwadee et al., "Efficient Content Location Using Interest-Based Locality in Peer-to-Peer Systems", IEEE Societies Twenty-Second Annual Joint Conference of the IEEE Computer and Communications, Mar. 30-Apr. 3, 2003, vol. 3, pp. 2166-2176.
Bryan et al., "A P2P Approach to SIP Registration and Resource Location draft-bryan-sipping-p2p-02", SIPPING WGInternet-Draft, Mar. 5, 2006, pp. 1-53.
Matuszewski et al., "Social Distributed Hash Table", IEEE Wireless Communications and Networking Conference, Mar. 11-15, 2007, pp. 2814-2820.
Tong et al., "Efficient content location based on interest-cluster in peer-to-peer system", IEEE International Conference, Oct. 12-18, 2005, pp. 324-331.
FileSharing for net, http://www.minihttpserver.net/fbbs/index.php, May 27, 2004.
Office action received for corresponding Chinese Patent Application No. 200480020040.7, dated Feb. 13, 2009, 8 pages of office action and 10 pages of office action translation.
Office action received for corresponding Korean Patent Application No. 2005-7022638, dated Dec. 12, 2006, 3 pages of office action and 2 pages of office action translation.
Non-Final Office action received for corresponding U.S. Appl. No. 10/446,574, dated Jun. 15, 2005, 17 pages.
Final Office action received for corresponding U.S. Appl. No. 10/607,618, dated Jun. 30, 2005, 27 pages.
Non-Final Office action received for corresponding U.S. Appl. No. 10/607,618, dated Dec. 21, 2005, 23 pages
Final Office action received for corresponding U.S. Appl. No. 10/446,574, dated Nov. 16, 2005, 15 pages.
Final Office action received for corresponding U.S. Appl. No. 10/446,574, dated May 12, 2006, 15 pages.
Non-Final Office action received for corresponding U.S. Appl. No. 10/446,574, dated Oct. 18, 2006, 14 pages.
Final Office action received for corresponding U.S. Appl. No. 10/446,574, dated Apr. 4, 2007, 14 pages.
Non-Final Office action received for corresponding U.S. Appl. No. 10/446,574, dated Jul. 23, 2007, 17 pages.
Final Office action received for corresponding U.S. Appl. No. 10/446,574, dated Dec. 20, 2007, 16 pages.
Final Office action received for corresponding U.S. Appl. No. 10/446,574, dated Apr. 29, 2009, 18 pages.
Non-Final Office action received for corresponding U.S. Appl. No. 10/446,574, dated Jun. 10, 2008, 19 pages.
International Preliminary Report on Patentability received for corresponding Patent Cooperation Treaty Application No. PCT/US2004/016544, dated Dec. 19, 2005, 5 pages.

(56) References Cited

OTHER PUBLICATIONS

International Search Report and Written Opinion received for corresponding Patent Cooperation Treaty Application No. PCT/US2004/016544, dated Nov. 29, 2005, 6 pages.
Office action received for corresponding Chinese Patent Application No. 200480020037.5, dated Aug. 15, 2008, 3 pages of office action and 3 pages of office action translation.
Office action receieved for corresponding Chinese Patent Application No. 200480020037.5, dated Nov. 9, 2007, 7 pages of office action translation.
Office action received for corresponding Korean Patent Application No. 2005-7022641, dated Dec. 14, 2006, 3 pages of office action and 2 pages of office action translation.
International Preliminary Report on Patentability received for corresponding Patent Cooperation Treaty Application No. PCT/US2004/016569, dated Dec. 15, 2005, 7 pages.
International Search Report and Written Opinion received for corresponding Patent Cooperation Treaty Application No. PCT/US2004/016569, dated Jul. 21, 2005, 7 pages.
Non-Final Office action received for corresponding U.S. Appl. No. 10/446,576, dated Jan. 9, 2008, 14 pages.
Final Office action received for corresponding U.S. Appl. No. 10/446,576, dated Aug. 7, 2007, 14 pages.
Non-Final Office action received for corresponding U.S. Appl. No. 10/446,576, dated Oct. 18, 2006, 12 pages
Final Office action received for corresponding U.S. Appl. No. 10/446,576, dated May 16, 2006, 11 pages.
Final Office action received for corresponding U.S. Appl. No. 10/446,576, dated Nov. 16, 2005, 12 pages.
Non-Final Office action received for corresponding U.S. Appl. No. 10/446,576, dated Jun. 15, 2005, 15 pages.
"Napster messages", Retrieved on Mar. 15, 2010, Webpage available at: http://opennap.sourceforge.net/napster.txt.
"The Gnutella Protocol Specification v0.4", Clip2 Distributed Search Services, Retrieved on Mar. 15, 2010, Webpage available at: http://www9.limewire.com/developer/gnutella protocol 0.4.pdf.
Schmidt, "Gridella: an open and efficient Gnutella-compatible Peer-to-Peer System based on the P-Grid approach", EPFL Technical Report, Oct. 2002, 109 pages.
Aberer et al., "Self-organized construction of distributed access structures: A comparative evaluation of P-Grid and FreeNet", EPFL Technical Report, 2002, 6 pages.
Dabek et al., "Building Peer-to-Peer Systems With Chord, a Distributed Lookup Service", Proceedings of the Eighth Workshop on Hot Topics in Operating Systems, IEEE Computer Society, 2001, 6 pages.
Shin et al., "Grapes: Topology-based Hierarchical Virtual Network for Peer-to-peer Lookup Services", Proceedings of the International Conference on Parallel Processing Workshops, IEEE Computer Society, 2002, 7 pages.
Gold et al., "Towards a Content-basedAggregation Network", Proceedings of the First International Conference on Peer-to-Peer Computing, IEEE Computer Society, 2002, 7 pages.
Lindemann et al., "A Distributed Search Service for Peer-to-Peer File Sharing in Mobile Applications", Proceedings of the Second International Conference on Peer-to-Peer Computing, IEEE Computer Society, 2002, 8 pages.
Kortuem et al., "When Peer-to-Peer comes Face-to-Face:Collaborative Peer-to-Peer Computing in Mobile Ad hoc Networks", Proceedings of the First International Conference on Peer-to-Peer Computing, IEEE Computer Society, 2002, 18 pages.
Hsiao et al., "Modeling and Evaluating Peer-to-Peer Storage Architectures", Proceedings of the International Parallel and Distributed Processing Symposium, IEEE Computer Society, 2002, 6 pages.
Traversat et al., "Project JXTA Virtual Network", Sun Microsystems, Inc., Oct. 28, 2002, pp. 1-10.
Cooper et al., "SIL: Modeling and Measuring Scalable Peer-to-Peer Search", Webpage available at: http://dbpubs.stanford.edu/pub/2003, printed Feb. 12, 2004.
Non-Final Office action received for corresponding U.S. Appl. No. 10/674,679, dated Jul. 25, 2007, 15 pages.
Garcia-Molina et al., "Open problems in data sharing peer-to-peer systems", Webpage available at: http://dbpubs.stanford.edu:8090/aux/index-en.html, printed Feb. 12, 2004.
Cooper et al., "Modeling and Measuring Scalable peer-to-peer search networks—Extended version", Proceedings of Association for Computing Machinery (ACM) Annual Conference of theSpecial Interest Group on Data Communications (SIGCOMM), 2002.
Non-Final Office action received for corresponding U.S. Appl. No. 10/697,622, dated Jul. 18, 2007, 17 pages.
Final Office action received for corresponding U.S. Appl. No. 10/697,622, dated Dec. 5, 2007, 15 pages.
Non-Final Office action received for corresponding U.S. Appl. No. 10/697,622, dated Jul. 22, 2008, 15 pages.
Final Office action received for corresponding U.S. Appl. No. 10/607,618, dated Jun. 21, 2006, 23 pages.
Non-Final Office action received for corresponding U.S. Appl. No. 10/607,618, dated Sep. 22, 2004, 23 pages.
Final Office Action in U.S. Appl. No. 10/886,002 dated Dec. 13, 2011.
Cohen, "BitTorrent Protocol Documentation", Webpage available at: <http://web.archive.org/web/20030202095656/bitconjurer.org/BitTorrent/protocol.html>, archive date Feb. 2, 2003, accessed Mar. 4, 2009.
Karthik, "Robustness of BitTorrent Protocol", Webpage available at: <http://web.archive.org/web/20031205222053/http://mnl.cs.stonybrook.edu/home/karthik/BitTorrent/Robustness_oCBT.doc.>, archive date Dec. 5, 2003.
"Brian's BitTorrent FAQ and Guide", Webpage available at: <http://web.archive.org/web/20030604041823/http://www.dessent.net/btfaq/>, archive date Jun. 4, 2003, accessed Mar. 4, 2009.
Kademlia, A Peer-to-Peer Information System Based on the XOR Metric, Webpage available at: <http://www.kademlia.net/>, published Mar. 2001.
Faster Than Kazaa and No Bundled Software, <http://www.limewire.com/english/content/features.shtml>, LimeWire current version 4.8. 1., accessed Apr. 12, 2005.
How Peer-To-Peer (P2P) and Kazaa Software Works, <http://www.kazaa.com/us/help/new_p2p.htm>, accessed Apr. 12, 2005.
LimeWire, For turbo charged downloads, use LimeWire PRO, <http://www.limewire.com/english/content/download.shtml>, accessed Apr. 12, 2005.
"Fast Track", Webpage available at: <http://www.fasttrack.nu>, accessed Oct. 3, 2002.
Notification of 2nd Office Action for CN200780012983.9 dated Dec. 16, 2011, with English translation.
Notification of 3rd Office Action for CN200580022710.3 dated Nov. 21, 2011, with English translation.
Daswani, et al., "Open Problems in Data-Sharing Peer-to-Peer Systems", Webpage available at: <http://dbpubs.stanford.edu:8090/aux/index-en.html>, printed Feb. 12, 2004, 15 pages.
Rejection Decision in CN200580022710.3 dated Jul. 20, 2012, with English Translation.

* cited by examiner

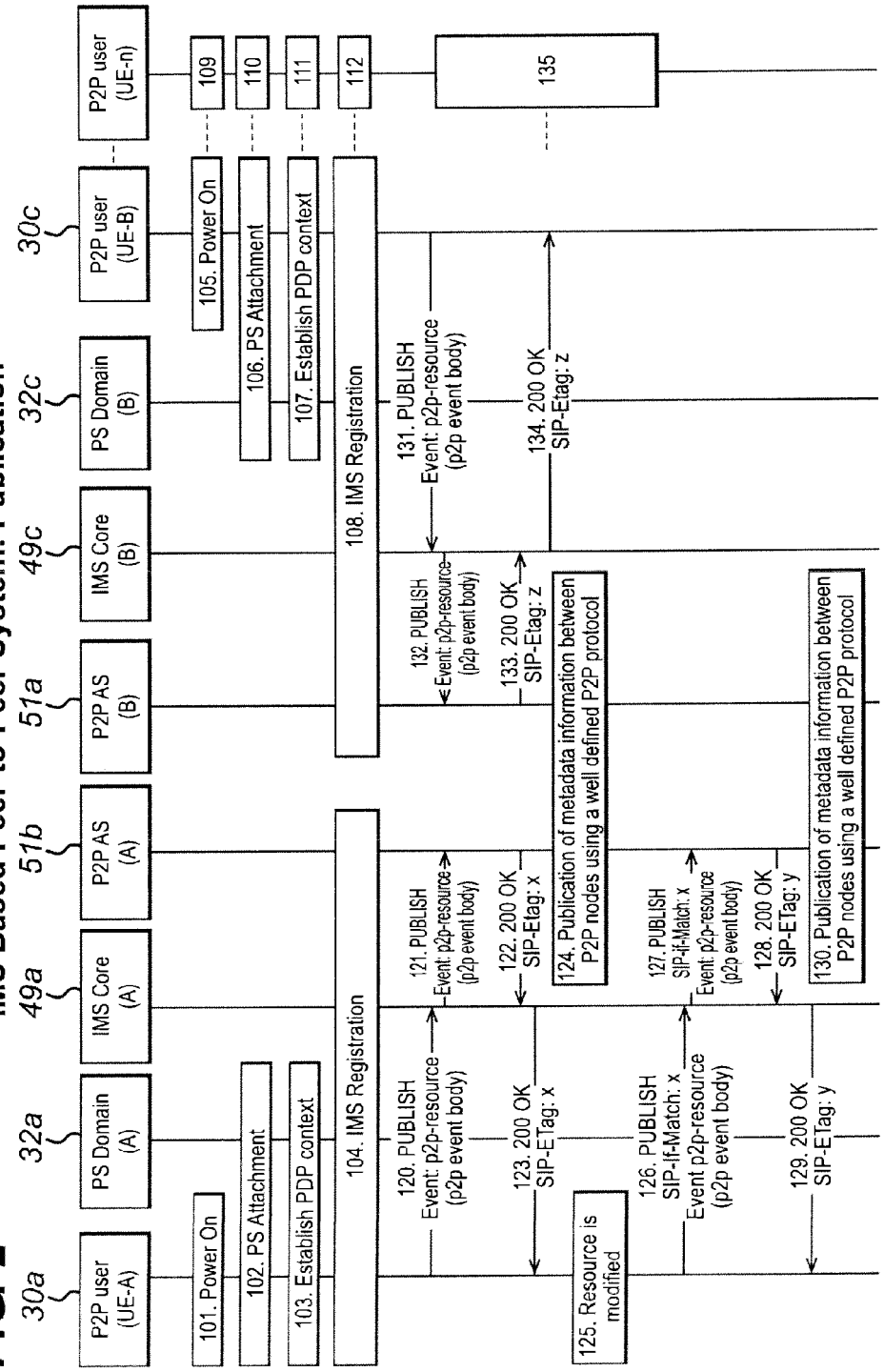

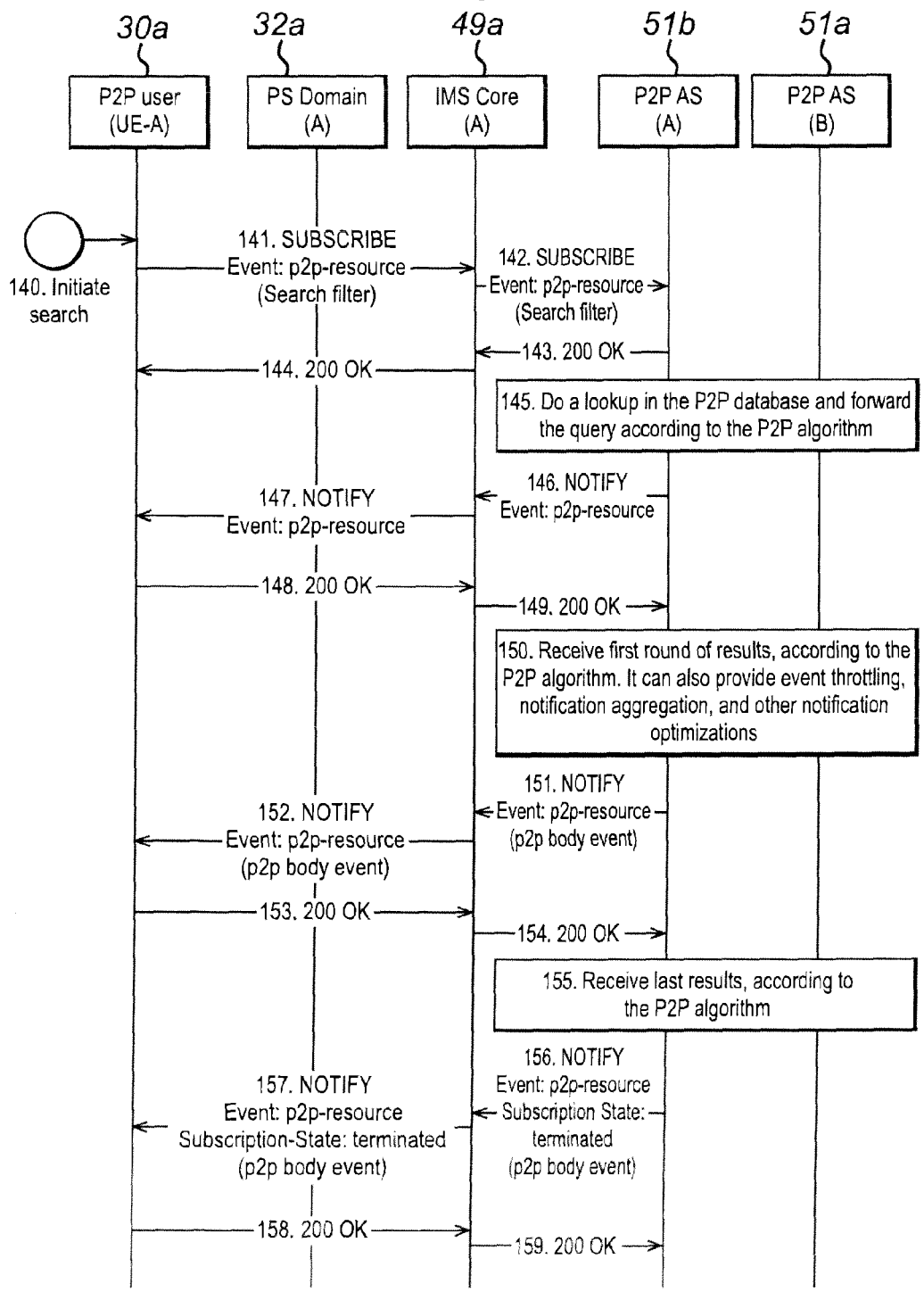

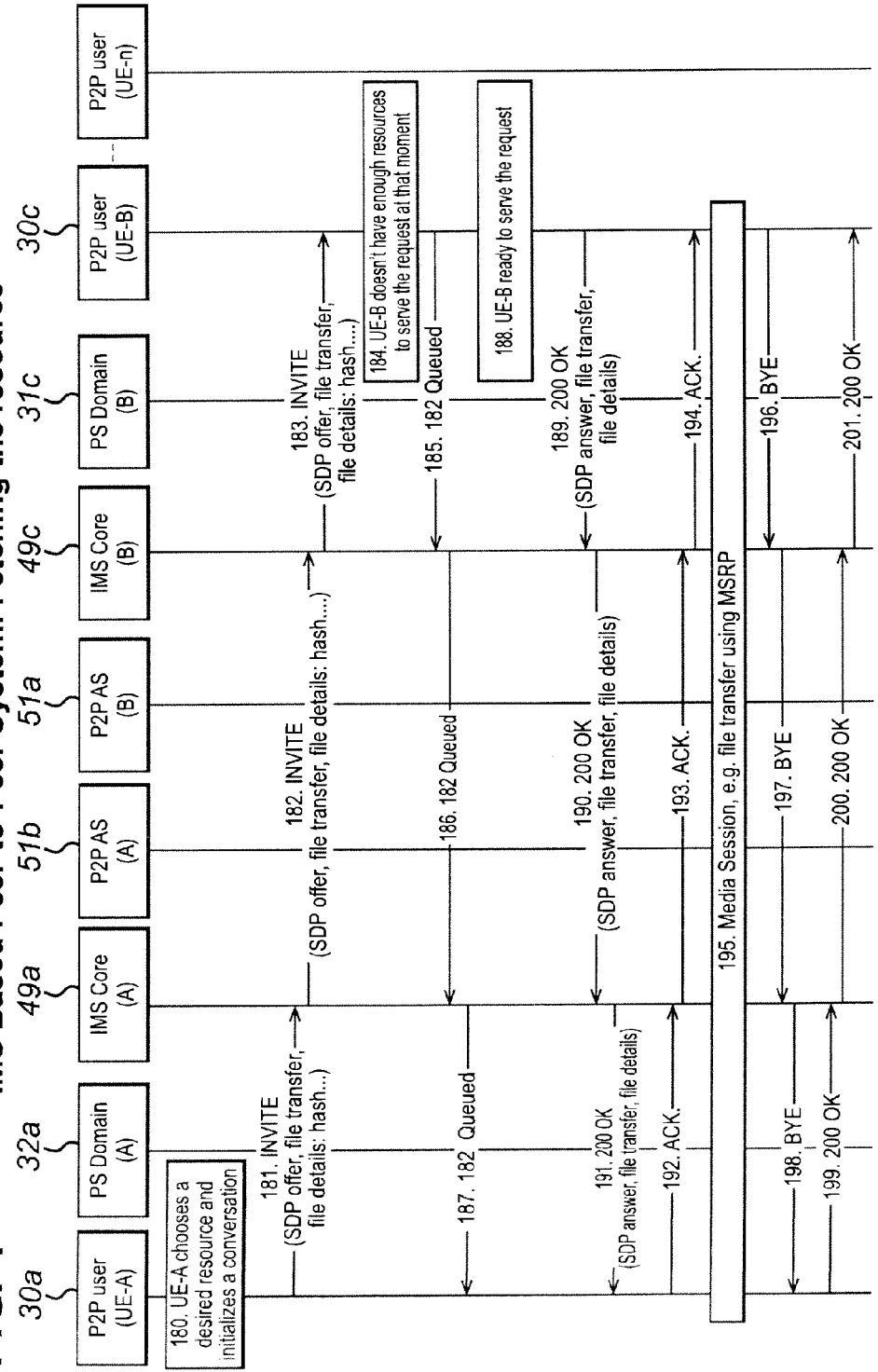

PEER TO PEER SERVICES IN A WIRELESS COMMUNICATION NETWORK

CROSS-REFERENCE TO RELATED PATENT APPLICATIONS

Great Britain Priority Application GB 0607294.6, filed Apr. 11, 2006 including the specification, drawings, claims and abstract, is incorporated herein by reference in its entirety.

FIELD OF THE INVENTION

The invention relates to a node and more specifically but not exclusively to a node for the provision of peer-to-peer network services within a wireless communications network.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section A communication system can be seen as a facility that enables communication sessions between two or more entities such as user equipment and/or other nodes associated with the communication system. The communication may comprise, for example, communication of voice, data, multimedia and so on. A session may, for example, be a telephone call between users or multi-way conference session, or a communication session between user equipment and an application server (AS), for example a service provider server. The establishment of these sessions generally enables a user to be provided with various services.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems providing wireless communication for user equipment are known. An example of the wireless systems is the public land mobile network (PLMN) and another example is the wireless local area network (WLAN). Fixed broadband access is another type of access.

The term "service" used above and hereinafter will be understood to broadly cover any service or goods which a user may desire, require or be provided with. The term also will be understood to cover the provision of complimentary services. In particular, but not exclusively, the term "service" will be understood to include Internet protocol multimedia IM services, conferencing, telephony, gaming, rich calls, etc.

An example of the services that may be offered for users such as the subscribers to a communication system are the so called multimedia services. Some of the communication systems enabled to offer multimedia services are known as Internet Protocol (IP) Multimedia networks. IP Multimedia (IM) functionalities can be provided by means of an IP Multimedia Core Network (CN) subsystem, or briefly IP Multimedia subsystem (IMS). The IMS includes various network entities for the provision of the multimedia services. The IMS services are intended to offer, among other services, IP connections between mobile user equipment.

Peer-to-peer (P2P) overlay networks, hereafter referred to as peer-to-peer networks or P2P networks, operating over conventional IP networks share a common characteristic, i.e., the full distribution of the resources with minimum intervention of centralized servers assisting the peers to share resource material. P2P networks are typically comprised of a group of elements (typically personal computers), known as peers, connected via a packet switched network such as the Internet. Resources, which can be anything, typically a file (such as an image, video clip or soundtrack) or a data stream (such as a video stream or digitally encoded voice data), are stored or generated in the peer elements. A P2P network therefore typically differs from a conventional resource network in that the conventional network uses a centralized server to typically provide the resource, whereas in the P2P network, the participants in the network provide the resource to other users. Known P2P networks such as Kazaa, WinMX, Emule, BitTorrent are file-sharing networks, whereas Skype is a telephony P2P network.

Although P2P networks are known for conventional PC networks, the use of P2P networks over wireless communication links has several problems.

A first problem with the use of P2P networks over a wireless communications network is that unlike a conventional user using a broadband connection the user is not continuously connected to the network. User equipment can temporarily be moved into locations where wireless coverage does not exist, for example underground in railway or road tunnels. Thus, IP users connecting via a general packet radio system (GPRS) communications system or via a wireless local area network (WLAN) connection where connections are not permanent would generate a significant amount of signalling overhead for the whole network as the users come in and out of the P2P network.

A second problem is that user equipment connected over a wireless communications network is typically network address translated. In other words the GPRS or WLAN network server provides the node with a private Internet protocol (IP) address. This private IP is not directly reachable from the internet and traffic has to be directed to a public IP address of the address translator which then redirects the packet to the user equipment. This limits the availability of the user equipment at the time of joining the P2P network. For example if the user equipment moves from one GPRS or WLAN network to a different network then the user equipment will receive a different private IP address and a different public IP address requiring the P2P network to be informed of the changes and increasing the signalling overhead.

WO2005/41534 discloses a pure ad-hoc network which has the disadvantages as described above.

US2003/125063 discloses a wireless communication P2P network where a series of network servers mirrors the content on the user equipment. Such systems are inefficient in that in order for the system to operate correctly, the mirrored content must initially be uploaded from the user equipment and maintained so that the content is maintained to be the same as that currently stored on the user equipment. This system is therefore both bandwidth inefficient, as all data is required to be uploaded to the mirror, and resource inefficient, as the same resource exists in at least two different locations.

US2004/0243665 and US2004/0243580 disclose a mobile user system for allowing communication between node users for peer-to-peer services.

Matuszewski, M., Beijar, N., Lehtinen, J. and Hyyryläinen, T. (2006) "Mobile Peer-to-Peer Content Sharing Application," Proceedings of IEEE Consumer Communications and Networking Conference, January, contains a demonstration of the P2P content sharing service, however such a system is modelled using a single super-peer node and does not provide information of the signalling associated with the system.

Beijar, N., Matuszewski, M., Lehtinen, J., and Hyyryläinen, T. (2005) "Mobile Peer-to-Peer Content Sharing Services in IMS," Proceedings of The International Conference on Telecommunication Systems, Modeling and Analysis 2005, November also contains a P2P content sharing architecture which could be applied to a IMS network. However it does not specifically disclose how to implement a P2P network with IMS signalling over the IMS architecture.

SUMMARY OF THE INVENTION

Embodiments of the present invention aim to address, or at least partially mitigate the problems disclosed above.

There is provided according to the present invention a node for providing peer-to-peer services in a communication network, the communication network comprising at least one further node, the node comprising: an input arranged to receive at least one SIP peer-to-peer request; an output arranged to transmit the at least one SIP peer-to-peer request from the node to at least one of the at least one further nodes; and wherein the input is further arranged to receive at least one SIP peer-to-peer response from the at least one further node, and the output is arranged to transmit the SIP peer-to-peer response.

The node input may be arranged to receive the at least one SIP peer-to-peer request from a user equipment (UE) via an access network.

The node output is preferably arranged to transmit the SIP peer-to-peer response to the UE via the access network.

The user equipment is preferably a P2P secondary node.

The node input is preferably arranged to receive the at least one SIP peer-to-peer request from at least one further of the further nodes.

The node output is preferably arranged to transmit the SIP peer-to-peer response to the at least one further of the further nodes.

The node is preferably a P2P primary node.

The peer-to-peer request may comprise a peer-to-peer resource publication.

The at least one peer-to-peer resource publication request may comprise a first information element.

The node preferably comprises a memory and may further be arranged to store the first information element within the memory.

The first information element is preferably at least one of: a resource name; a file name; a resource type; a resource size; a icon representing the resource; a short description of the resource; a hash of the resource; a SIP URI of the address of the resource; a terminal address of the resource; a timestamp of the resource; a globally routable user agent URI of the user where the file is stored; access rights associated with the resource; and metadata associated with the resource.

The at least one peer-to-peer resource publication request is preferably a SIP PUBLISH request.

The SIP peer-to-peer request preferably comprises a search request comprising a requested resource element.

The search request is preferably a SIP SUBSCRIBE request.

The node may further comprise a memory wherein the node is preferably arranged to search the memory for an address of at least one node comprising the requested resource which matches the requested resource element.

The SIP peer-to-peer response may comprise an address of a network node comprising a requested resource which matches the search request search information element.

The SIP peer-to-peer response preferably comprises a SIP NOTIFY message.

The address may comprise at least one of: a SIP uniform resource identifier (URI); a network node address; a terminal address; and a globally routable user agent URI (GRUU).

The SIP peer-to-peer response may comprise the resource, wherein the resource further comprises a requested resource element, said resource element comprising at least one of: a resource name; a file name; a resource type; a resource size; a icon representing the resource; a short description of the resource; a hash of the resource; access rights associated with the resource, and metadata associated with the resource.

The communications network preferably comprises an IP multimedia subsystem.

The node is preferably a SIP peer-to-peer application server.

At least one node as described above is preferably incorporated into an overlay peer-to-peer network.

There is provided according to a second aspect of the invention a user equipment arranged to communicate with a node for providing peer-to-peer services in a communication network, wherein the node is in use, a node in a network comprising at least one further node, the user equipment comprising: an output arranged to transmit at least one SIP peer-to-peer request to the node via an access network; and an input arranged to receive at least one SIP peer-to-peer response from the node via the access network.

The at least one SIP peer-to-peer request is preferably a peer-to-peer resource publication.

The at least one peer-to-peer resource publication request preferably comprises a first information element.

The first information element may be at least one of: a resource name; a file name; a resource type; a resource size; a icon representing the resource; a short description of the resource; a hash of the resource; a SIP URI of the address of the resource; a terminal address of the resource; a timestamp of the resource; a globally routable user agent URI of the user where the file is stored, access rights associated with the resource, and metadata associated with the resource.

The at least one peer-to-peer resource publication request is preferably a SIP PUBLISH request.

The SIP peer-to-peer request may be a search request preferably comprising a requested resource element.

The search request is preferably a SIP SUBSCRIBE request.

The SIP peer-to-peer response preferably comprises an address of a node comprising a requested resource which matches the search request search information element.

The SIP peer-to-peer response is preferably a SIP NOTIFY message.

The address preferably comprises at least one of: a SIP URI; a network node address; a terminal address; and a globally routable user agent URI (GRUU).

The response message may comprise the resource comprising a requested resource element, said resource element may comprise at least one of: a resource name; a file name; a resource type; a resource size; a icon representing the resource; a short description of the resource; a hash of the resource; the access rights associated with the resource, and metadata associated with the resource.

The input is preferably arranged to receive at least one further SIP peer-to-peer response from the node via the access network.

The at least one further SIP peer-to-peer response preferably comprises an address of a further node comprising the requested resource which matches the search request search information element.

The user equipment may be arranged to display the address of the node comprising the requested resource which matches the search request search information element.

The user equipment is preferably arranged to communicate with the node comprising the requested resource which matches the search request resource element to access the requested resource.

The user equipment is preferably arranged to initiate the communication with the node comprising the requested resource which matches the search request resource element to access the requested resource by transmitting a SIP request.

According to a third aspect of the present invention there is provided a communications network comprising: at least one node as described above, at least one user equipment as described above; an access network arranged to receive a SIP peer-to-peer request transmitted from the at least one user equipment; an IP multimedia network core arranged to receive the SIP peer-to-peer request from at least the access network and other IP multimedia networks; wherein the node is arranged to receive the SIP peer-to-peer request from the IP multimedia network core.

The IP multimedia network is preferably arranged to receive the SIP peer-to-peer response transmitted from the node for the at least one user equipment, and is further preferably arranged to forward the SIP peer-to-peer response to the access network, and the access network is arranged to forward the SIP peer-to-peer response to the at least one user equipment.

According to a fourth aspect of the present invention there is provided a method for operating a SIP peer-to-peer network between nodes within a communications network comprising the steps of: receiving at a node at least one SIP peer-to-peer request from a user equipment via an access network; transmitting from the node the at least one SIP peer-to-peer request to at least one other node; receiving at the node a SIP peer-to-peer response message from the at least one other node; transmitting from the node the SIP peer-to-peer response message to the mobile user equipment.

The SIP peer-to-peer request is preferably a publication request comprising a first information element.

The method may further comprise the step of storing the first information element within an information store of the node.

The first information element may be at least one of: a resource name; a file name; a resource type; a resource size; a icon representing the resource; a short description of the resource; a hash of the resource; a SIP URI of the address of the resource; a terminal address of the resource; a timestamp of the resource; a globally routable user agent URI of the user where the file is stored; access rights associated with the resource; and metadata associated with the resource.

The publication request is preferably a SIP PUBLISH request.

The peer-to-peer request is preferably a search request comprising a search information element.

The search request is preferably a SIP SUBSCRIBE request.

The method may further comprise the step of searching an information store for an address of a node comprising a resource which matches the search request search information element.

The response message may comprise the address of the node comprising the resource which matches the search request search information element.

The response message is preferably a SIP NOTIFY request.

The address of the node preferably comprises at least one of: a SIP URI; a terminal address; and a globally routable user agent URI (GRUU).

The response message may comprise the requested resource which matches the search request search information element, including at least one of: a resource name; a file name; a resource type; a resource size; a icon representing the resource; a short description of the resource; a hash of the resource; access rights associated with the resource; and metadata associated with the resource.

According to a fifth aspect of the present invention there is provided a computer program arranged to operate on a computer for operating a peer-to-peer network between nodes within a wireless communications network comprising the steps of: receiving at a node at least one peer-to-peer request from a mobile user equipment via a radio access network; transmitting from the node the at least one peer-to-peer request to at least one other node; receiving at the node a response message from the at least one other node; and transmitting from the node the response message to the mobile user equipment.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 2 shows a schematic view of how a user may publish resources information using an embodiment of the present invention;

FIG. 3 shows a schematic view of how a user may search for resource information using an embodiment of the present invention; and FIG. 4 shows a schematic view of how a user may fetch resource information using an embodiment of the present invention.

DETAILED DESCRIPTION OF THE PREFERRED EMBODIMENTS

Figure 1:
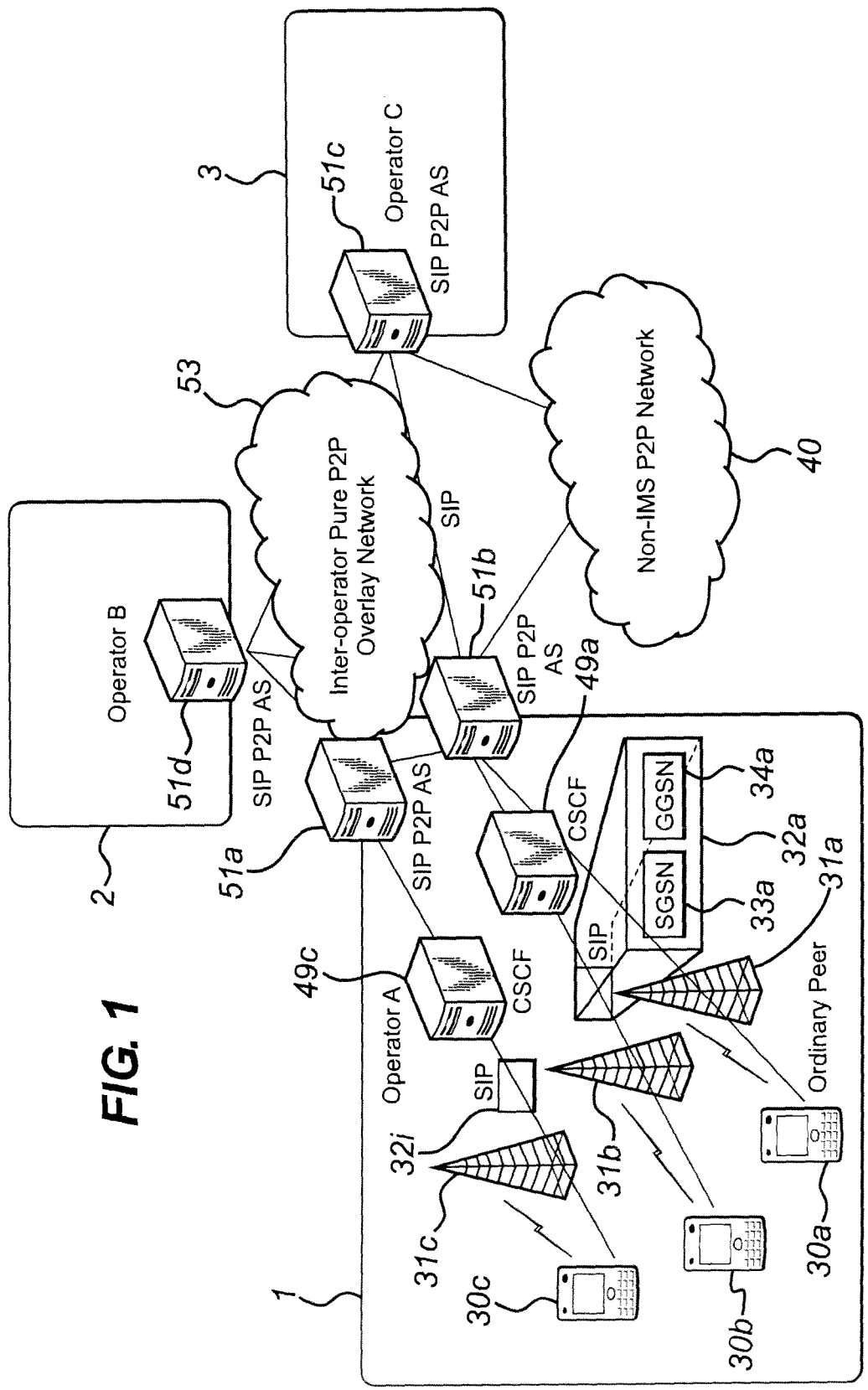
FIG. 1 shows a schematic view of a communication system featuring embodiments of the present invention.

Embodiments of the present invention relate particularly but not exclusively to IMS networks. Embodiments of the invention may be applicable to other networks.

Reference is made to FIG. 1 which shows three operators operating three separate network domains 1, 2, and 3. For clarity only the network domains operated by operator A 1 are shown in detail. The operator A network domain 1 is shown as an IP Multimedia Subsystem (IMS) network comprising several network nodes, such as Call/Session Control Functions (CSCFs), and SIP P2P Application Servers (AS). IP Multimedia (IM) functionalities can be provided by means of a Core Network (CN) subsystem including various entities for the provision of the service.

Base stations 31a, 31b and 31c are arranged to transmit signals to and receive signals from mobile user equipment 30a, 30b and 30c of mobile users. Correspondingly, each of the mobile user equipment 30a, 30b and 30c is able to transmit signals to and receive signals from the base stations 31a, 31b and 31c via the wireless interface. In the simplified presentation of FIG. 1, the base stations 31a and 31b belong to a first radio access network and the base station 31c belongs to a separated radio access network (RAN). In the shown arrangement, each of the user equipment 30a, 30b, 30c may access the IMS network via the two access networks associated with base stations 31a, 31b and 31c, respectively. It shall be appreciated that, although for clarity FIG. 1 shows the base stations of only two radio access networks, a typical mobile communication network usually includes a number of radio access networks. In embodiments of the invention the fixed user equipment, is able to be connected to the core network via either the radio access network or one or more other access networks, such as an asymmetric digital subscriber line (ADSL) access network.

The 3G radio access network (RAN) is typically controlled by an appropriate radio network controller (RNC). This controller is not shown in order to enhance clarity. A controller may be assigned for each base station or a controller can control a plurality of base stations. Solutions wherein controllers are provided both in individual base stations and in the radio access network level for controlling a plurality of base stations are also known. It shall thus be appreciated that the name, location and number of the network controllers depends on the system.

The mobile user equipment 30a, 30b, 30c may use any appropriate mobile device adapted for Internet Protocol (IP) communication to connect the network. For example, the mobile user equipment 30a, 30b, 30c may access the cellular network by means of a Personal computer (PC), Personal Data Assistant (PDA), mobile station (MS) and so on. The following examples are described in the context of mobile stations.

One skilled in the art is familiar with the features and operation of a typical user equipment 30a, 30b, 30c. Thus, a detailed explanation of these features is not necessary. It is sufficient to note that the user may use the user equipment 30a, 30b, 30c for tasks such as for making and receiving phone calls, for receiving and sending data from and to the network and for experiencing e.g. multimedia content. A user equipment 30a, 30b, 30c is typically provided with processor and memory means for accomplishing these tasks. A user equipment 30a, 30b, 30c may include antenna means for wirelessly receiving and transmitting signals from and to base stations of the mobile communication network. A user equipment 30a, 30b, 30c may also be provided with a display for displaying images and other graphical information for the user of the user equipment 30a, 30b, 30c. Speaker means may are also be provided. The operation of user equipment 30a, 30b, 30c may be controlled by means of an appropriate user interface such as control buttons, voice commands and so on.

It shall be appreciated that although only three user equipment 30a, 30b, 30c are shown in FIG. 1 for clarity, a number of user equipment 30a, 30b, 30c may be in simultaneous communication.

The core network (CN) entities typically include various control entities and gateways for enabling the communication via a number of radio access networks and also for interfacing a single communication system with one or more communication system such as with other cellular systems and/or fixed line communication systems. In FIG. 1 serving GPRS support nodes (SGSN) 33a and gateway GPRS support nodes (GGSN) 34a are used for provision of support for GPRS services in the network.

The radio access network controller is typically connected to an appropriate core network entity or entities such as, but not limited to, the serving general packet radio service support nodes (SGSN) 33a. Although not shown, each SGSN typically has access to designated subscriber database configured for storing information associated with the subscription of the respective user equipment.

User equipment 30a, 30b, 30c within the radio access network may communicate with a radio network controller. The radio access network controller is in communication with the serving GPRS support node via an appropriate interface, for example on an Iu interface.

The serving GPRS support node 33a, in turn, typically communicates with a gateway GPRS support node (GGSN) 34a via the GPRS backbone network 32a, 32c. This interface is commonly a switched packet data interface. The serving GPRS support node and/or the gateway GPRS support node are for provision of support for GPRS services in the network.

The user equipment 30a, 30b, 30c may connect, via the GPRS network, to application servers that are generally connected to the IMS.

The communication systems have developed such that services may be provided for the user equipment by means of various functions of the network that are handled by network entities known as servers. For example, in the current third generation (3G) wireless multimedia network architectures it is assumed that several different servers are used for handling different functions. These include functions such as the call session control functions (CSCFs) 49a, 49c. The call session control functions may be divided into various categories such as a proxy call session control function (P-CSCF), interrogating call session control function (I-CSCF), and serving call session control functions (S-CSCF). A user who wishes to use services provided by an application server via the IMS system may need to register with a serving control entity. The serving call session control function (S-CSCF) may form in the 3G IMS arrangements the entity a user needs to be registered with in order to be able to request for a service from the communication system. The CSCFs 49a, 49c may define an IMS network of a UMTS system.

It shall be appreciated that similar functionality may be referred to in different systems with different names. For example, in certain applications the CSCFs 49a, 49c may be referenced to as the call state control functions.

It should be appreciated that while embodiments of the invention have been described in relation to user equipment such as mobile stations, embodiments of the invention are applicable to any other suitable type of user equipment. In this document the term, terminal is intended to cover all the examples of user equipment described.

Although FIG. 1 shows the Radio Access Network as a '3G' radio access network, it would be appreciated that the user equipment may communicate to the IMS network via other radio access networks. Further examples of radio access networks include WLAN systems such as those wireless networks described by the IEEE 802.x family of standards, and the IrDA and Bluetooth standards. Further more, although FIG. 1 shows a Radio Access Network, other types of non-Radio Access Networks, such as ADSL, ADSL2, SDSL, VDSL, Ethernet, Frame Relay, etc., can also be used by user equipment to connect to the core network.

FIG. 1 shows a plurality of SIP P2P application servers 51a, 51b, 51c, 51d. Two of the SIP P2P application servers 51b and 51a are shown as being connected to the operator A CSCFs 49a and 49c respectively. The two SIP P2P application servers 51c and 51d are shown as being located within the networks operated by operators C and B respectively. The SIP P2P application servers 51a, 51b are arranged to form an intra-operator P2P overlay network. The SIP P2P application servers 51a, 51b, 51c, 51d form an inter operator pure P2P overlay network 53. Each SIP P2P application server comprises inputs for receiving data from external sources and outputs for transmitting data to external sources, such as other SIP P2P application servers or UEs. Furthermore each SIP P2P application server comprises memory for storing data received from the external sources.

These SIP P2P application servers 51a, 51b, 51c, 51d are arranged to operate as regular application servers with regard to IMS operations. Additionally these nodes are arranged to operate as primary or super nodes as defined according to P2P terminology (in other words communication between these nodes operates on a pure P2P overlay network, i.e., all of the SIP P2P application servers 51a, 51b, 51c, 51d are true peers).

Thus each SIP P2P application server 51a, 51b, 51c, 51d is arranged to transmit and receive session initiation protocol (SIP) messages to and from other SIP P2P application servers 51a, 51b, 51c, 51d located in the same network domain (to form the intra-operator network) or in different domains (to form the inter-operator network). The SIP P2P application servers 51a, 51b, 51c, 51d have several different responsibilities. The SIP P2P application servers 51a, 51b, 51c, 51d operate as front-end servers for the UEs 30a, 30b, 30c. The SIP P2P application servers 51a, 51b, 51c, 51d operate to make the resources of the network available to other super nodes. The SIP P2P application servers 51a, 51b, 51c, 51d assist the UEs to get the results from searches for resources from the P2P network, as well as maintaining the P2P overlay network for resource sharing.

In some embodiments of the present invention, more than one algorithm is used to distribute information across the network. For example, the inter-operator P2P overlay network 53 can implement different P2P algorithms, such as a flooding algorithm, or a distributed hash table algorithm. The chosen algorithm can be determined so that the best algorithm for distributing the information is applied. Similarly, intra-operators P2P overlay networks can, in embodiments of the present invention, implement different P2P algorithms.

Within this network, the UEs 30a, 30b, 30c are arranged to operate as secondary or ordinary P2P nodes. The UEs 30a, 30b, 30c therefore are arranged to connect to and depend on the SIP P2P application servers 51a, 51b, 51c, 51d. UEs 30a 30b, 30c, authorised to use the SIP P2P application servers 51a, 51b, 51c, 51d, are configured so that when the user of the UE wishes to use the P2P service, then the UE is routed to one of the SIP P2P application servers 51a, 51b, 51c, 51d.

In such a network, the UEs 30a, 30b, 30c are responsible for publishing information about their shared resources as well as initiating searches for resources. Thus once a UE 30a, 30b, 30c discovers where a resource is stored, it initiates a regular SIP session towards the discovered server/UE to act upon the resource (e.g., fetch a file, join a chat group, stream content, etc.) The secondary SIP session may not traverse any SIP P2P application server 51a, 51b, 51c, 51d and therefore, it is a regular P2P SIP session between two UEs, or between a UE and a server, or between two servers.

In FIG. 1 it is also shown that some of the SIP P2P application servers 51a, 51b, 51c, 51d can be arranged to connect to a non-IMS P2P network, thus enabling the range of the P2P network to extend beyond the IMS P2P networks created by the intra-operator, pure P2P overlay network and the inter-operator, pure P2P overlay networks.

The following now describes the signalling flows that are carried out by the embodiments of the present invention in order that the user may publish resource information, search for resource information, and retrieve resource information.

With respect to FIG. 2 the signalling flow shown is carried out by embodiments of the present invention to publish resource information in order that this information may be used by other users.

Steps 101 to 104 show the procedure carried out in starting or rebooting the user equipment.

Step 101 shows the user equipment 30a powering on. In other embodiments this may be a hard or soft reset of the user equipment 30a.

Step 102 shows the user equipment 30a attaching to the packet switched (PS) network domain 32a via the radio access network which is shown in FIG. 1 as the base station 31a.

Once the PS domain attachment has been successfully carried out, step 103 can be carried out. In step 103 the user equipment 30a establishes a packet data protocol (PDP) context with the packet switched (PS) domain 32a. On successful conclusion of PDP context establishment the method passes to step 104.

In step 104, the UE 30a registers to the IMS. This is shown as the UE 30a being registered at the IMS core shown as the CSCF 49a and the SIP P2P application server 51b.

Steps 105 to 108 show the same process being carried out by a second user equipment 30c as it attaches via the radio access network 31c to the packet switched domain 32c and registers on the IMS network (shown as the CSCF 49c and SIP P2P application server 51a).

Steps 109 to 112 show the same process being carried out by further user equipment.

Steps 120 to 124 show the data flow procedure carried out by the UE 30a when it starts the SIP P2P application stored in memory. Prior to step 120, the UE 30a may carry out a local search in one or more predefined directories or folders for resources to be published. As has been previously described, these resources can be files such as image files, messages, audio clips, mp3 files, video files, or other files indicated by the user to be used as resource data, or they can be other types of resources, such as chat rooms, users, services, or streaming content.

In step 120, the user equipment 30a transmits a SIP PUBLISH message to the CSCF 49a via the packet switched domain 32a. Within the SIP PUBLISH message a P2P-resource event is embedded. The P2P-resource event contains various types of information which assist other users in determining the content of the resource found during the search procedure. The information within the P2P-resource event can be in various embodiments the file name, the type of the resource (whether the resource content is for example an image, or an audio file), the size of the resource, an icon representing the resource (for example, a thumbnail of the resource if it is an image file), a short description of the resource, a hash of the file, the SIP URI (i.e., the SIP address) and terminal address (e.g., the use of a globally routable user agent URI (GRUU)) of the user and user agent where the file is stored, the access rights associated with the resource, and other metadata associated with the resource.

In step 121, upon receiving the SIP PUBLISH request message at the IMS core (CSCF) 49a the request message is routed to the SIP P2P AS 51b that is serving the user.

Instep 122 the SIP P2P AS 51b, on receipt of the request, sends a '200 OK' response message to the IMS core (represented by the CSCF) 49a. The response message, according to IETF RFC 3903, includes a SIP-ETag header containing the entity-tag allocated to the resource.

It should be indicated that at this point, the actual resource (for example, the file) is not transmitted to the SIP P2P AS 51*b*, and only the metadata associated with the resource has been transmitted. The SIP P2P AS 51*b* serving the UE 30*a* stores the metadata information. In other embodiments of the invention storage of the metadata can be carried out in other SIP P2P ASes 51*a*, 51*c*, 51*d*. In some embodiments the metadata is stored on more than one SIP P2P AS 51*a*, 51*b*, 51*c*, 51*d*.

In step 123 the SIP '200 OK' response message is routed via the IMS core (CSCF) 49*a* and the packet switched domain 32*a* to the UE 30*a*.

In step 124 the SIP P2P AS 51*b* operates as a super node integrated in an overlay SIP P2P network. On reception of the SIP PUBLISH request message from one of the UE 30*a*, the SIP P2P AS 51*b* publishes the resource metadata information in the overlay SIP P2P network. The actual publication of resource metadata is dependent on the chosen peer-to-peer algorithm used in the overlay network. For example, in a first embodiment of the invention where the SIP P2P distribution algorithm is based on flooding, the SIP P2P AS does not necessarily contact nor exchange any resource metadata with other SIP P2P ASes (as the search requests propagate through the SIP P2P AS on the network). In a further embodiment of the invention where the SIP P2P distribution algorithm is based on the Chord algorithm, the SIP P2P AS updates the resource metadata and furthermore transmits it to at least one further SIP P2P AS node that according to the used distributed hash table algorithm are responsible for storing the resource metadata. The SIP P2P AS may also store the information in its own resource database.

Steps 131 to 134 show the data flows for the second UE30*c* publishing resource information. Step 131 is similar to step 120 in that the second UE transmits a SIP PUBLISH message to the CSCF 49*c* via the packet switched domain 32*c*. Step 132 is similar to step 121 in that the request message is routed to the SIP P2P AS that is serving the user. Step 133 is similar to step 122 in that the SIP P2P AS, on receipt of the SIP PUBLISH request, sends a 200 OK response message to the IMS core (represented by the CSCF) with the SIP-ETag z. Step 134 is similar to step 123 where the SIP '200 OK' response message is routed via the IMS core (CSCF) and the packet switched domain to the UE 30*b*.

Step 135 is a simplified step reflecting the steps carried out by the further UE in publishing the resource information.

Steps 125 to 130 show the updating process as used in embodiments of the present invention. This process is used where after the publication of the resource information the resource is modified in the UE.

Step 125 is the step where the resource (for example, the file representing an image, or an audio file), is modified in the UE 30*a*. This modification in one embodiment of the invention occurs when information associated with the resource is modified—for example access rights associated with the resource are changed (e.g., the user decides to restrict access to the resource to one access group). The modification in a further embodiment of the invention occurs when the resource is itself modified (for example, where an image file is edited, e.g., to suppress the effect known as 'red eye', or when an audio file is edited, e.g. to suppress silence or apply some noise filter).

A modification to either the resource or information associated with the resource may change the metadata information. This change, for example, where the resource is a file, is typically reflected by a change in the file's size, but also typically changes the hash value of the file.

The UE 30*a* in step 126 on detecting a change in either a resource as described above, or in detecting new content having been added/deleted from the searched folders or directories, transmits a new SIP PUBLISH request message towards the IMS Core (as represented by CSCF 49*a*). The SIP PUBLISH request message differs from the SIP publish request message as transmitted in step 120 in that the message contains a SIP-if-Match header field containing the latest received entity tag value.

In step 127, on receiving the updating SIP PUBLISH request message at the IMS core (CSCF) 49*a* the updating SIP PUBLISH request message is routed to the SIP P2P AS 51*b* that is serving the user.

In step 128, the SIP P2P AS 51*b*, on receipt of the updating SIP PUBLISH request message, sends a '200 OK' response message to the IMS core (represented by the CSCF) 49*a*. The response message, according to IETF RFC 3903, includes a SIP-ETag header containing the entity-tag allocated to the updated resource.

In step 129, the SIP 200 OK response message is routed via the IMS core (CSCF) 49*a* and the packet switched domain 32*a* to the UE 30*a*.

In step 130, the SIP P2P AS 51*b* on reception of the updating SIP PUBLISH request message from one of the UE 30*a*, the SIP P2P AS 51*b* re-publishes the resource metadata information in the overlay SIP P2P network associated with the updated resources or the newly added resources. As described above the actual republication of resource metadata is dependent on the chosen peer-to-peer algorithm used in the overlay network.

With respect to FIG. 3, the signalling flows shown are carried out by embodiments of the present invention to search for resource information on the network.

In step 140, the user initiates in the UE 30*a* a search. In a first embodiment of the present invention, the search is initiated when the user inputs 'keyword(s)' to search for resources matching the input. In other embodiments of the invention the user inputs other values to search for—for example the input may be a fragment of a digitised audio file or a image or video clip.

In step 141 the UE constructs a SIP SUBSCRIBE request message. In the absence of an input, a subscription to the p2p-resource event may return the metadata of all resources available through the overlay SIP P2P network. As the user is only interested in resources associated with the user inputs, the SIP SUBSCRIBE request message contains a filter body that limits the returned results to those which are linked with the user input values and are adequate for the users' profile (for example preventing a child from accessing adult themed resources such video clips containing adult themed violence).

In step 142, the SIP SUBSCRIBE request received by the IMS core (represented by the CSCF 49*a*) is routed to the SIP P2P AS 51*b* which is serving the user.

In step 142, the SIP P2P AS 51*b* receives the SIP SUBSCRIBE request, and in step 143, the SIP P2P AS 51*b* responds to the SIP SUBSCRIBE request by transmitting a '200 OK' response message to the IMS Core (represented by the CSCF 49*a*).

In step 144, the '200 OK' response message, having been received by the IMS Core (CSCF 49*a*) is routed to the UE 30*a* via the packet switched domain 32*a*. Thus the UE 30*a* is able to determine that the search request has been received.

In step 145, the SIP P2P AS 51*b*, on receipt of the SIP SUBSCRIBE request message, carries out a lookup in its database to search for the address of the server/UE that holds the resource specified in the filter. This search operation is dependant on the peer-to-peer algorithm implemented over the network. Thus in the flooding algorithm based embodiments of the invention then if the SIP P2P AS 51*b* has been 'pushed' with the input filter information, then the SIP P2P AS 51*b* 'explodes' the SUBSCRIBE request to each of or a subset of its neighbouring SIP P2P ASes (i.e., copies the request to the neighbouring SIP P2P ASes), these neighbouring SIP P2P ASes in turn 'explode' the SUBSCRIBE request to their neighbours, and so on. Each of the SIP P2P ASes which receive the SUBSCRIBE request message then perform a search of their database to search for the address of the server/UE that holds the resource, i.e., a server/UE that has previously published metadata relating to the filter.

In a separate embodiment of the invention where the Chord algorithm is implemented as the peer-to-peer algorithm in the network, then the SIP P2P AS 51*b* carries out a lookup on the 'finger' table and transmits a single SIP SUBSCRIBE request to the closest predecessor of a key associated with a resource in its finger table. The precedent SIP P2P AS node can in further embodiments and dependent on the request forwards or proxies the request to further SIP P2P AS nodes or to other P2P nodes.

In step 146, the SIP P2P AS 51*b* also sends a SIP NOTIFY request to the IMS core (CSCF 49*a*).

In step 147, the IMS core 49*a* on receipt of the SIP NOTIFY request routes the request to the UE 30*a*.

According to an embodiment of the present invention, the SIP NOTIFY request may contain a first collection of information (e.g. server/UE address information) about the searched resources. For example if such information is already available at the SIP P2P AS 51*b* (due to publication operations from other UEs 30*b* to the SIP P2P AS 51*b*; or because of cached information from previous searches; or because of publication information passed to the SIP P2P AS from other SIP P2P ASes).

However, typically in embodiments of the invention the SIP NOTIFY request does not contain information about the searched resources. In this scenario the SIP NOTIFY request is required in order to follow the procedure required by the protocol (IETF RFC 3265) after each successful SUBSCRIBE request and its main purpose is to indicate the subscription state.

In step 148, the UE 30*a* answers the NOTIFY request by transmitting a '200 OK' response firstly to the IMS core 49*a* (step 148), which is then routed to the SIP P2P AS 51*b* (step 149).

In step 150 the SIP P2P AS 51*b* receives a first round of results for the searched resource from other SIP P2P ASes. As these SIP NOTIFY responses are received information on the search becomes available.

In step 151, according to an embodiment of the invention, subject to the user's preferences (in other words the rate of notifications received, bandwidth consumption, and event throttling), the SIP P2P AS 51*b* sends a SIP NOTIFY request message to the IMS core 49*a*.

In step 152, the IMS core routes the SIP NOTIFY request message to the UE 30*a*.

The SIP NOTIFY request message described in steps 151 and 152 contains data in the body of the message according to the P2P-resource event package. The event package contains all the metadata information associated to each resource. For example if the resource was a file, then the event package can include the file name, size, type, icon (if it is an image file), hash value, timestamp, SIP URI and/or UE address (GRUU) of the user where the file is available.

In some embodiments of the present invention, the event package body contains information about several resources (e.g., files) that match the search criteria. As would be understood by the person skilled in the art several resources could match the search criteria in several reasons. For example, each resource (file) could be the result of duplications throughout the SIP P2P overlay network due to multiple downloads (this would be the case in popular files).

In step 153, the UE 30*a* acknowledges the reception of the SIP NOTIFY request by transmitting a '200 OK' response to the IMS Core 49*a*. In step 154 the SIP '200 OK' message is routed to the SIP P2P AS 51*b*.

Every time the SIP P2P AS 51*b* receives information regarding the search from the P2P overlay network, the information is sent to the UE 30*a* in a separate SIP NOTIFY request (providing that the user's preferences with respect the rate of notifications allows these requests to be sent). These SIP NOTIFY request messages echo the steps 151 to 154. As the embodiment of the invention forwards each information element received separately UE 30*a* user interface can be arranged to display the received information sequentially, as soon as it is received and therefore produce a system that is user friendly in that it displays results quickly and without the need to correlate all of the received information before displaying—therefore allowing the user to make a quick selection of the searched results before all of the results are received. This is particularly an advantage where multiple copies of the same resource are available on the network.

Steps 155 to 159 show the ending of the search operation according to embodiments of the invention.

In step 155, it is determined in the SIP P2P AS 51*b* that the last result of the search has been made available to the SIP P2P AS 51*b* from the overlay SIP P2P network, or where in embodiments of the invention the search is time limited after the search within the overlay SIP P2P network expires past the predetermined time period.

In step 156, the SIP P2P AS 51*b* sends a SIP NOTIFY request to the IMS core 49*a* addressing the UE 30*a*. The SIP NOTIFY request contains the latest available results within the p2p resource event (where there are any to report). The SIP NOTIFY request also sets the Subscription-State header field to "terminated" to indicate to the UE that this NOTIFY request is the end of the search operation.

In step 157, the SIP NOTIFY request is routed from the IMS core 49*a* to the UE 30*a* via the PS domain 32*a*.

In step 158, the UE 30*a* acknowledges the receipt of the SIP NOTIFY request by transmitting a SIP '200 OK' message to the IMS core addressing the SIP P2P AS, which is then routed by the IMS core to the SIP P2P AS 51*b* (step 159).

On receipt of a NOTIFY request that contains information about the availability of a resource in another UE or network element (also referred to as a node) (e.g., steps 152 or 157), the UE 30*a* stores the received information for further usage.

In further embodiments of the present invention, the user can also cancel the search operation by arranging the UE 30*a* to send a SIP SUBSCRIBE request to the SIP P2P AS 51*b* containing an 'Expires' header field set to zero. In this case, the SIP P2P AS 51*b* automatically times out and the steps 156 onwards can be followed.

With respect to FIG. 4 the signalling flows are shown which are carried out by embodiments of the present invention to fetch resource information on the network.

In step 180, the user selects a resource to be acted upon, typically by interacting with the user interface of the mobile device. If the resource is a file, the file may be fetched. If the resource is a chat room, conference, user name, or streaming video, a session is initiated towards that resource.

In step 181, once the resource and the address of the one or more server/UE where the resource is stored has been selected, the UE sends a SIP INVITE request message addressed to each of the one or more server/UEs where the resource is stored to the IMS Core 49a. The address of the server/UE where the resource is stored has been learnt in a search operation, such as the one described earlier in FIG. 3. For clarity FIG. 4 shows the scenario where the resource is stored only at one remote location, specifically the second UE 30c. The SIP INVITE request contains an SDP offer (a session description protocol offer) indicating a request for a resource transfer operation. The SDP offer also contains enough metadata to indicate the resource to be retrieved, particularly in the case of file transfer, e.g., the hash of the requested file.

In step 182, the SIP INVITE request is routed in the IMS Core towards the address of the second UE 30c where the resource is stored. The SIP INVITE request 182 need not get routed through the SIP P2P AS 51b serving the UE 30a nor the SIP P2P AS 51a serving the second UE 30c. However, the operator's policy may dictate that the SIP INVITE request 182 must traverse any of the SIP P2P AS 51b or 51a, e.g., for providing appropriate accounting or authorization. Or for example, the SIP P2P AS may provide an address translation function from public to private IP addresses. For the sake of simplicity, FIG. 4 shows the embodiment of the invention when the SIP INVITE request 182 does not traverse any of the SIP P2P AS 51a or 51b.

In step 183, the SIP INVITE request is routed from the IMS core 49c to the second IMS core of the remote UE 30c.

In step 184, the remote UE 30c receives the INVITE request and determines if it is able to serve the request. For example, the processing power of the UE, available bandwidth, maximum number of transfer operations, etc., may determine that the UE is not able to service the request at this moment. If the remote UE 30c is unable to service the request immediately then steps 185 to 187 are carried out, else the operation moves to step 188 to service the request.

If the remote UE 30c is not able to serve the request due to scarce resources, the remote UE 30c transmits a SIP '182 Queued' response to the requesting UE 30a and the request is queued in a local queue. The SIP '182 Queued' response is transmitted from the remote UE 30c to the remote IMS core 49c in step 185, from the remote IMS core 49c to the requesting IMS core 49a in step 186, and from the requesting IMS core 49a to the requesting UE 30a in step 187.

In step 188, the remote UE 30c determines it is able to serve the received request for the resource. The remote UE 30c then transmits a SIP '200 OK' response message addressed to the requesting UE 30a containing the SDP answer. In some embodiments of the invention the SDP may also contain the file related information. The SIP '200 OK' response is transmitted from the remote UE 30c to the remote IMS core 49c in step 189, from the remote IMS core 49c to the requesting IMS core 49a in step 190, and from the requesting IMS core 49a to the requesting UE 30a in step 191.

In step 195, the media session is established which transfers the resource from the remote UE 30c to the requesting UE 30a without the assistance of the SIP P2P ASes. The media session can use any of the known transfer protocols to transfer the data from the remote to the requesting UE, however one preferred transfer protocol is the Message Session Relay Protocol (MSRP, draft-ietf-simple-message-sessions, work in progress). Other transfer protocols which can be used in embodiments of the invention, but do not limit embodiments of the invention to are, File Transfer Protocol (FTP, RFC 959), Hypertext Transfer Protocol (HTTP, RFC 2616), File delivery of Unidirectional Transport (FLUTE, RFC 3926).

In steps 196 to 201, the end of the transfer session is signalled to and acknowledged by the requesting UE 30a. When the media session ends, the remote UE 30c transmits a SIP BYE request addressed to the requesting UE 30a to close the session. The SIP BYE request is transmitted from the remote UE 30c to the remote IMS core 49c in step 196, from the remote IMS core 49c to the requesting IMS core 49a in step 197, and from the requesting IMS core 49a to the requesting UE 30a in step 198. The requesting UE 30a then acknowledges the request by transmitting a SIP '200 OK' response addressed to the remote UE 30c. The SIP '200 OK' response is transmitted from the requesting UE 30a to the requesting IMS core 49a in step 199, from the requesting IMS core 49a to the remote IMS core 49c in step 200, and from the remote IMS core 49c to the remote UE 30c in step 201.

The above embodiments of the invention solve the problems mentioned above. In providing a front-end P2P node as the distributor of information associated with a resource, signalling to the UEs or servers containing the resource is reduced and therefore the problem of intermittent connectivity of remote UEs is reduced. The associated information is available whether or not the resource is at that moment in contact with the network.

Furthermore, providing that the SIP P2P ASes are themselves provided with a public IP address which is reachable from the internet then the problem of having network address translated UEs is reduced.

Also, the P2P network as embodied in the invention only produces a minimum impact on the existing IMS network by using the SIP P2P ASes to provide the overlay network. The operator of the network is therefore able to use the existing network nodes with an additional routing filter to route the SIP requests and responses as described above. The operator can also implement a charging system for the usage of SIP P2P services.

Embodiments of the invention described above can be used by users to share resources such as sharing photos between family members. In such an embodiment a closed SIP P2P overlay network comprising the specific members (of the family) and associated SIP P2P ASes acting as super nodes is created. Members can take images for example using their UEs which are published to the SIP P2P overlay network. Published images can then be immediately downloaded by other members of the family to be viewed in the other members' UEs.

Other examples of closed overlay networks are in publishing and displaying images and video clips of properties for sale or rent taken by a specific estate agent or broker. The estate agent can publish images or video clips to the closed overlay network, which can be searched and fetched by potential clients authorized to search the published resources.

A further example of an overlay network in use would be where during a sporting event, for example a football game, where images/video clips can be made by members of the public watching the event. These clips are published to the overlay network and are made available to other members of the public watching the event in order that they can see a different point of view.

FIGS. 1 to 4 above show that each UE connects to a single SIP P2P AS. However in other embodiments of the invention each UE may connect to more than one SIP P2P SA in order that load balancing and redundancy can be exploited. In other cases a UE can be connected to more than one P2P network (e.g., a family picture sharing service and a estate agent network), in which case the UE is connected to more than one SIP P2P AS, each SIP P2P AS being part of a different P2P overlay network.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the word "component" and "node" as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. An apparatus comprising:
   one or more computers; and
   memory storing computer executable instructions, the memory and the computer executable instructions configured to, with the one or more computers, cause the apparatus to:
   receive a Session Initiation Protocol (SIP) peer-to-peer request from a mobile user equipment peer via a radio access network, the SIP peer-to-peer request including metadata associated with a resource file pre-stored on the mobile user equipment peer and available for sharing over a peer-to-peer network;
   transmit the SIP peer-to-peer request from the apparatus to at least one second server;
   wherein the at least one second server is selected based on a first peer-to-peer algorithm when the at least one second server is within an intra-operator peer-to-peer network, and wherein the at least one second server is selected based on a second peer-to-peer algorithm when the at least one second server is within an inter-operator peer-to-peer network;
   wherein the first peer-to-peer algorithm and the second peer-to-peer algorithm are each selected from one of a flooding algorithm and a Chord algorithm;
   wherein in the flooding algorithm, the apparatus does not exchange the metadata with the at least one second server, and the computer executable instructions are configured to, with the one or more computers, cause the apparatus to perform the transmit of the SIP peer-to-peer request from the apparatus to the at least one second server as an explode to at least one of a subset of neighboring servers;
   wherein in the Chord algorithm, the computer executable instructions are configured to, with the one or more computers, cause the apparatus to update the metadata, perform a lookup on a finger table, and perform the transmit of the SIP peer-to-peer request from the apparatus to the at least one second server as a transmit to a closest predecessor of a key associated with the resource file in the finger table; and
   wherein the apparatus is a peer-to-peer Session Initiation Protocol application server configured to operate in a core network of a mobile communication network, and wherein the apparatus is distinct from mobile user equipment peers in the peer-to-peer network.

2. The apparatus as claimed in claim 1, wherein the computer executable instructions are configured to, with the one or more computers, cause the apparatu to receive at least one SIP peer-to-peer response from the at least one second server and transmit the at least one SIP peer-to-peer response to the mobile user equipment peer via the radio access network.

3. The apparatus as claimed in claim 2, wherein the computer executable instructions are configured to, with the one or more computers, cause the apparatus to transmit the at least one SIP peer-to-peer response to the mobile user equipment peer via a third server.

4. The apparatus as claimed in claim 2, wherein the at least one SIP peer-to-peer response comprises a SIP NOTIFY message.

5. The apparatus as claimed in claim 2, wherein the at least one SIP peer-to-peer response comprises information comprising at least one of:
   a resource name;
   a file name;
   a resource type;
   a resource size;
   an icon representing the resource;
   a short description of the resource;
   a hash of the resource; and
   access rights associated with the resource.

6. The apparatus as claimed in claim 1, wherein the mobile user equipment peer is a peer-to-peer secondary node.

7. The apparatus as claimed in claim 1, wherein the computer executable instructions are configured to, with the one or more computers, cause the apparatus to receive the SIP peer-to-peer request from the mobile user equipment peer via a third server.

8. The apparatus as claimed in claim 1, wherein the apparatus is a peer-to-peer primary node.

9. The apparatus as claimed in claim 1, wherein the SIP peer-to-peer request comprises a peer-to-peer resource publication request.

10. The apparatus as claimed in claim 9, wherein the peer-to-peer resource publication request comprises a first information element.

11. The apparatus as claimed in claim 10, wherein the apparatus is configured to store the first information element in the memory.

12. The apparatus as claimed in claim 10, wherein the first information element is at least one of:
   a resource name;
   a file name;
   a resource type;
   a resource size;
   an icon representing the resource;
   a short description of the resource;
   a hash of the resource;
   a timestamp of the resource; and
   access rights associated with the resource.

13. The apparatus as claimed in claim 1, wherein the SIP peer-to-peer request comprises a search request identifying the resource file.

14. The apparatus as claimed in claim 13, wherein the search request is a SIP SUBSCRIBE request.

15. The apparatus as claimed in claim 13, wherein the computer executable instructions are configured to, with the one or more computers, cause the apparatus to search the memory for an address of a network node comprising a stored resource file which matches the resource file identified in the search request.

16. The apparatus as claimed in claim 13, wherein the computer executable instructions are configured to, with the one or more computers, cause the apparatus to transmit at least one SIP peer-to-peer response comprising at least one address of at least one network node comprising a stored resource file which matches the resource file identified in the search request.

17. The apparatus as claimed in claim 16 wherein the at least one address comprises at least one of:
   a SIP Uniform Resource Identifier;
   a network node address;
   a terminal address; and
   a globally routable user agent Uniform Resource Identifier.

18. The apparatus as claimed in claim 1, wherein the apparatus is within an IP multimedia subsystem.

19. A system comprising the peer-to-peer network and the apparatus as claimed in claim 1.

20. The apparatus of claim 1, wherein the peer-to-peer Session Initiation Protocol application server is located in a core network of a cellular wireless communications network.

21. A method, comprising:
   receiving at a server a Session Initiation Protocol (SIP) peer-to-peer request from a mobile user equipment peer via a radio access network, the SIP peer-to-peer request including metadata associated with a resource file pre-stored on the mobile user equipment peer and available for sharing over a peer-to-peer network,
   the server being a peer-to-peer session initiation protocol application server configured to operate in a core network of a mobile communication network, and the server being distinct from mobile user equipment peers in the peer-to-peer network; and
   transmitting from the server the SIP peer-to-peer request to at least one second server, wherein the at least one second server is selected based on a first peer-to-peer algorithm when the at least one second server is within an intra-operator peer-to-peer network, and wherein the at least one second server is selected based on a second peer-to-peer algorithm when the at least one second server is within an inter-operator peer-to-peer network;
   wherein the first peer-to-peer algorithm and the second peer-to-peer algorithm are each selected from one of a flooding algorithm and a Chord algorithm;
   wherein in the flooding algorithm, the server does not exchange the metadata with the at least one second server, and the transmitting includes exploding the SIP peer-to-peer request from the server to the at least one second server as at least one of a subset of neighboring servers;
   wherein in the Chord algorithm, the transmitting includes updating the metadata, performing a lookup on a finger table, and transmitting the SIP peer-to-peer request from the server to the at least one second server as a closest predecessor of a key associated with the resource file in the finger table.

22. The method as claimed in claim 21, further comprising:
   receiving at the server at least one SIP peer-to-peer response from the at least one second server; and
   transmitting from the server the at least one SIP peer-to-peer response to the mobile user equipment peer via the radio access network.

23. The method as claimed in claim 22, wherein the at least one SIP peer-to-peer response is transmitted to the mobile user equipment peer via a third server.

24. The method according to claim 22, wherein the SIP peer-to-peer response comprises information comprising at least one of:
   a resource name;
   a file name;
   a resource type;
   a resource size;
   an icon representing the resource;
   a short description of the resource;
   a hash of the resource; and
   access rights associated with the resource.

25. The method as claimed in claim 21, wherein the at least one SIP peer-to-peer request is received from the mobile user equipment peer via a third server.

26. The method as claimed in claim 21, wherein the SIP peer-to-peer request comprises a peer-to-peer resource publication request comprising a first information element.

27. The method as claimed in claim 26, further comprising storing the first information element within a memory.

28. The method as claimed in claim 26, wherein the first information element is at least one of:
   a resource name;
   a file name;
   a resource type;
   a resource size;
   an icon representing the resource;
   a short description of the resource;
   a hash of the resource;
   a timestamp of the resource; and
   access rights associated with the resource.

29. The method as claimed in claim 21, wherein the SIP peer-to-peer request is a search request that is a SIP SUBSCRIBE request identifying the resource file.

30. The method as claimed in claim 29, further comprising searching a memory for an address of a node comprising a stored resource file which matches the resource file identified by the SIP SUBSCRIBE request.

31. The method as claimed in claim 29, further comprising transmitting at least one SIP peer-to-peer response comprising at least one address of at least one network node comprising a stored resource the which matches the resource file identified by the SIP SUBSCRIBE request.

32. The method as claimed in claim 31, wherein the at least one address comprises at least one of:
   a SIP Uniform Resource Identifier;
   a network node address;
   a terminal address; and
   a globally routable user agent Uniform Resource Identifier.

33. The method of claim 21, wherein the peer-to-peer Session Initiation Protocol application server is located in a core network of a cellular wireless communications network.

34. An apparatus, comprising:
   one or more computers; and
   memory storing computer executable instructions, the memory and the computer executable instructions configured to, with the at least one or more computers, cause the apparatus to:
   receive, via a radio access network, a session initiation protocol peer-to-peer search request identifying a requested resource file;
   search the memory for at least one address of at least one mobile user equipment peer having pre-stored therein a stored resource file which is available for sharing over a peer-to-peer network and which matches the requested resource file;
   transmit the session initiation protocol peer-to-peer search request to at least one server; and
   transmit a session initiation protocol peer-to-peer response comprising at least one of the at least one address;
   wherein the apparatus is a peer-to-peer session initiation protocol application server configured to operate in a core network of a mobile communication network,
   wherein the apparatus is distinct from mobile user equipment peers in the peer-to-peer network;
   wherein the at least one server is selected based on a first peer-to-peer algorithm when the at least one server is within an intra-operator peer-to-peer network;
   wherein the at least one server is selected based on a second peer-to-peer algorithm when the at least one server is within an inter-operator peer-to-peer network;
   wherein the first peer-to-peer algorithm and the second peer-to-peer algorithm are each selected from one of a flooding algorithm and a Chord algorithm;
   wherein in the flooding algorithm, the apparatus does not exchange, with the at least one server, metadata associated with the resource file when transmitting the session initiation protocol peer-to-peer search request, and the transmitting includes exploding the session initiation protocol peer-to-peer search request from the apparatus to the at least one server within a subset of neighboring servers; and
   wherein in the Chord algorithm, the transmitting includes updating the metadata, performing a lookup on a finger table, and transmitting the session initiation protocol peer-to-peer search request from the apparatus to the at least one server as a closest predecessor of a key associated with the resource file in the finger table.

35. An apparatus, comprising:
   one or more computers; and
   memory storing computer executable instructions, the memory and the computer executable instructions configured to, with the at least one or more computers, cause the apparatus to:
   receive, via a radio access network, a session initiation protocol peer-to-peer resource publication request comprising a first information element associated with a resource file pre-stored on a mobile user equipment peer and available for sharing over a peer-to-peer overlay network; and
   transmit the session initiation protocol peer-to-peer publication request to at least one server;
   wherein the apparatus is a peer-to-peer session initiation protocol application server configured to operate in a core network of a mobile communication network;
   wherein the apparatus is distinct from mobile user equipment peers in the peer-to-peer network;
   wherein the at least one server is selected based on a first peer-to-peer algorithm when the at least one server is within an intra-operator peer-to-peer network;
   wherein the at least one server is selected based on a second peer-to-peer algorithm when the at least one server is within an inter-operator peer-to-peer network;
   wherein the first peer-to-peer algorithm and the second peer-to-peer algorithm are each selected from one of a flooding algorithm and a Chord algorithm;
   wherein in the flooding algorithm, the apparatus does not exchange, with the at least one server, metadata associated with the resource file when transmitting the session initiation protocol peer-to-peer publication request, and the transmitting includes exploding the session initiation protocol peer-to-peer publication request from the apparatus to the at least one server within a subset of neighboring servers; and
   wherein in the Chord algorithm, the transmitting includes updating the metadata, performing a lookup on a finger table, and transmitting the session initiation protocol peer-to-peer publication request from the apparatus to the at least one server as a closest predecessor of a key associated with the resource file in the finger table.

* * * * *

UNITED STATES PATENT AND TRADEMARK OFFICE
CERTIFICATE OF CORRECTION

| | |
|---|---|
| PATENT NO. | : 8,693,391 B2 |
| APPLICATION NO. | : 11/486490 |
| DATED | : April 8, 2014 |
| INVENTOR(S) | : Miguel A. Garcia-Martin et al. |

It is certified that error appears in the above-identified patent and that said Letters Patent is hereby corrected as shown below:

In the Claims

In Column 18, Claim 2, Line 33:
　　Please remove "apparatu" and replace with --apparatus--.

In Column 21, Claim 31, Line 1:
　　Please remove "resource the which" and replace with --resource file which--.

Signed and Sealed this
Twelfth Day of August, 2014

Michelle K. Lee
*Deputy Director of the United States Patent and Trademark Office*